United States Patent Office 2,751,404
Patented June 19, 1956

2,751,404

PROCESS FOR THE CATALYTIC TREATMENT OF GASES CONTAINING CARBON COMPOUNDS AND HYDROGEN

Bernhard Löpmann, Bergkamen, near Kamen, Germany, assignor to Chemische Werke Essener Steinkohle A. G., Bergkamen, Germany No Drawing. Application May 16, 1952,
Serial No. 288,304

Claims priority, application Germany May 17, 1951

5 Claims. (Cl. 260—449.6)

This invention relates to the production of synthetic fuel and it has particular relation to a new and improved process for carrying out the Fischer-Tropsch synthesis for producing synthetic fuel.

It has been known that in the so-called Fischer-Tropsch synthesis hydrocarbons are produced from CO and $H_2$, which are present preferably in the molecular proportion of $1CO:2H_2$, in the presence of iron or preferably cobalt catalysts at elevated temperature below the level at which methane is formed. The starting material of this process is the so-called synthesis gas which is prepared for example from bituminous coal, coke, low temperature coke, coke-oven gas, or lignite, in known manner and contains about two parts of $H_2$ to one part of CO. The process can be carried out in one or several phases and under normal atmospheric pressure or under medium-pressure, i. e. 5–20 atm. (Fischer-Pichler medium-pressure synthesis). The terms "Fischer-Tropsch process" or "Fischer-Tropsch synthesis" are used in the present specifications and claims to include this normal-pressure synthesis, as well as the medium-pressure synthesis and their various modifications.

I have now found that the Fischer-Tropsch synthesis can be carried out with particular advantage by proceeding in the following manner.

Coke-oven gas is passed in a preliminary step over a cobalt catalyst at temperatures ranging from about 100° to 180° C. and under atmospheric pressure or under moderately elevated pressure up to about 284 lbs. per square inch. In this treatment part of the carbon monoxide is converted into higher alcohols containing more than 2 carbon atoms, particularly n-propyl alcohol, which are separated from the treated gas, for example by cooling. The residual gas is then converted into so-called synthesis gas in a manner which is known by itself and does not form part of my present invention, and the resulting synthesis gas is treated by a process of the Fischer-Tropsch synthesis. Conversion of the residual gas resulting from the preliminary step of my invention can take place in any suitable manner, for example by the water-gas shift reaction, i. e. by converting part of the carbon monoxide with steam to carbon dioxide and hydrogen, or by decomposing methane in water gas generators, or by mixing the pretreated coke-oven gas with purified water gas. The gas obtained in this manner contains about 2 parts $H_2$ for 1 part CO and is denoted "synthesis gas" in the present specification and claims.

I have further found that the yield of higher alcohols in the above mentioned preliminary step of my invention can be considerably increased by adding to the coke-over gas unsaturated aliphatic hydrocarbons, particularly olefins, such as ethylene, prior to passing the coke-oven gas over the cobalt catalyst. Such increase of the yield can also be obtained by adding to the coke-oven gas to be treated, in the preliminary step of my invention, cracked gases which have been produced from high-boiling hydrocarbons by cracking and are rich in olefines. Such cracked gases can be, for example, introduced into the reaction chamber through which the coke-oven gas is caused to pass in the preliminary step.

Example 1

Coke oven gas is passed in a reaction chamber at a temperature of 150° C. and under atmospheric pressure during 48 hours over a cobalt catalyst. The gas discharged from the reaction chamber contains per $m^3$ 3,4 grams of higher alcohols which are separated by cooling.

After this preliminary treatment and separation of the alcohols, the gas is converted into synthesis gas by one of the before mentioned methods. The resulting gas is treated according to the Fischer-Tropsch process under normal atmospheric or moderately increased pressure, e. g. 5–20 atm., preferably in the presence of a cobalt catalyst.

The coke oven gas used as starting material had the following composition:

| | Percent |
|---|---|
| $CO_2$ | 3.0 |
| CnHm | 2.0 |
| CO | 6.7 |
| $H_2$ | 55–60 |
| $CH_4$ | 25 |
| $N_2$ | 3–8 |

The formula CnHm denotes hydrocarbons other than methane, mainly olefins.

Example 2

In the preliminary phase of the process described in Example 1 of the process is carried out at 140° C. and under a pressure of about 220 lbs. per square inch. The other conditions of the preliminary treatment and the subsequent steps of the process are substantially the same as in Example 1.

Example 3

To each $m^3$ of the coke oven gas used in Example 1, 13–25 grams of ethylene are added. The preliminary treatment is then carried out at 140° C. under a pressure of 220 lbs. per square inch, while conversion into synthesis gas and treatment of the latter are carried out in the same manner as in Example 1.

Example 4

Coke oven gas is mixed with 5 volume-percent of cracked gases rich in olefins and is then passed over a cobalt catalyst at a temperature of 144° C. under a pressure of 220 lbs. per square inch for 48 hours.

Further treatment takes place in the manner described in Example 1.

The coke oven gas used in this example had the following composition:

| | Percent |
|---|---|
| $CO_2$ | 2.2 |
| CnHm | 3.0 |
| CO | 6.8 |
| $H_2$ | 52.6 |
| $CH_4$ | 28.2 |
| $N_2$ | 6.4 |
| $O_2$ | 0.8 |

The cracked gases added to the coke oven gas were obtained by cracking of higher boiling hydrocarbon fractions.

Example 5

In the procedure described in Example 1, the preliminary treatment is carried out at 115°–120° C. and under a pressure of 220 lbs. per square inch during 48 hours, while the other conditions described in Example 1 remain unchanged.

Combination of the preliminary treatment with the Fischer-Tropsch synthesis according to my invention has essential advantages. In proceeding in the manner described, higher efficiency of the catalytic material is obtained and formation and recovery of valuable alcohols in the preliminary phase take place without affecting the value of the synthetic fuel formed by the subsequent Fischer-Tropsch synthesis. The economic advantages of the combination are obvious.

The gases used in the method of my invention are purified by conventional methods in order to remove harmful ingredients, particularly inorganic and organic sulfur compounds.

The cobalt catalysts adapted to be used in the preliminary treatment and the Fischer-Tropsch synthesis are prepared according to known methods for example from a boiling solution of nitrates of cobalt and thorium (and, if desired, magnesium), by addition of sodium carbonate, subsequent addition of kieselguhr, and filtration and washing. The dried catalyst is reduced with hydrogen in thin layers at 360°–400° C. and atmospheric pressure. The catalyst may, for example, consist of 100 Co, 18 $ThO_2$ and 100 kieselguhr or 100 Co, 5 $ThO_2$, 7.5 MgO and 200 kieselguhr.

It will be understood that this invention is not limited to the above described steps, proportions, catalysts and other details specifically described and can be carried out with various modifications without departing from the scope of the invention as defined in the appended claims.

What is claimed is:

1. A method of producing synthetic fuel comprising (a) a preliminary phase in which coke oven gas is caused to pass over a cobalt catalyst at a temperature in the range of 100° to 180° C. under a pressure in the range of ordinary atmospheric pressure up to about 284 lbs. per square inch, in order to form higher alcohols, which are separated from the gas; (b) converting the gas resulting from phase (a) into synthesis gas and (c) subjecting the synthesis gas to treatment under the conditions of the Fischer-Tropsch process.

2. A method as claimed in claim 1, in which olefine hydrocarbons are added to the coke oven gas prior to the treatment in the preliminary phase.

3. A method as claimed in claim 1, in which ethylene is added to the coke oven gas prior to the treatment in the preliminary phase.

4. A method as claimed in claim 1, in which cracked gases rich in olefines are added to the coke oven gas prior to the treatment in the preliminary phase.

5. A method of producing synthetic fuel, comprising (a) a preliminary phase in which coke oven gas is caused to pass over a cobalt catalyst at a temperature in the range of 100° C. to 180° C. under a pressure in the range of ordinary atmospheric pressure up to about 284 lbs. per square inch, in order to form higher alcohols which are separated from the gas; (b) converting the gas resulting from said preliminary phase into synthesis gas, by adjusting its composition to about 2 parts $H_2$ for one part CO and treating the resulting gas in the presence of a catalyst selected from the group of iron and cobalt catalysts at elevated temperature below the level at which methane is formed.

References Cited in the file of this patent

UNITED STATES PATENTS

| | | |
|---|---|---|
| 2,274,064 | Howard et al. | Feb. 24, 1942 |
| 2,460,508 | Johnson et al. | Feb. 1, 1949 |
| 2,542,747 | Barrick | Feb. 20, 1951 |
| 2,544,271 | Liedholm et al. | Mar. 6, 1951 |
| 2,549,111 | Millendorf et al. | Apr. 17, 1951 |
| 2,670,385 | Rosenthal et al. | Feb. 23, 1954 |